Oct. 11, 1927.
D. B. SALSTROM
1,644,952
WOOD CARVING MACHINE
Filed July 23, 1924   5 Sheets-Sheet 5
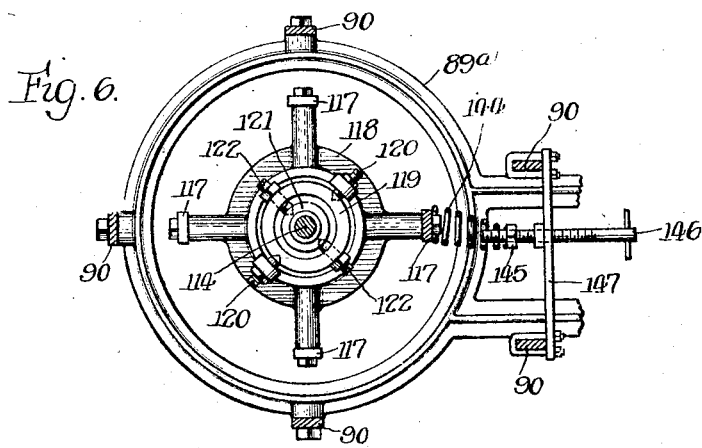
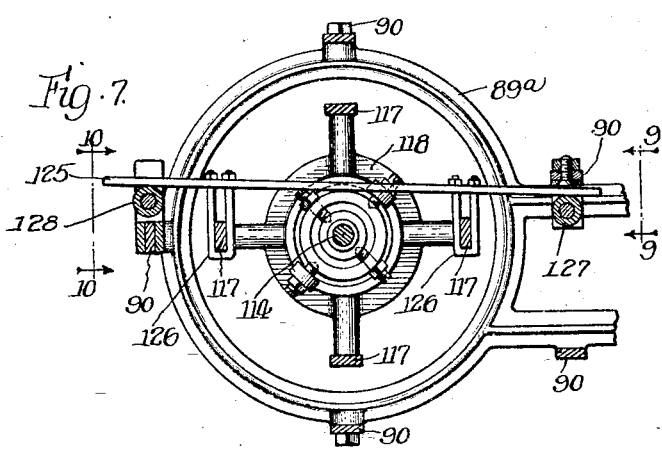
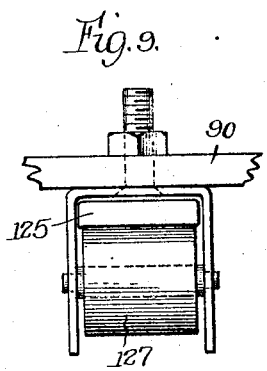
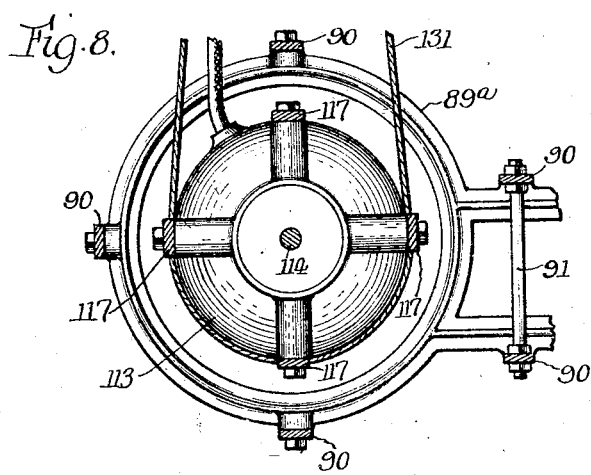
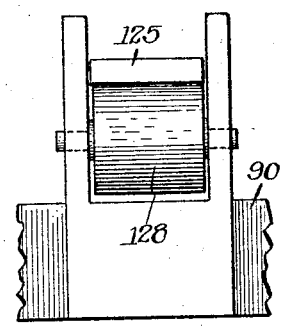
Inventor:
D. B. Salstrom,
By Churchill Parker Carlson
Attys.

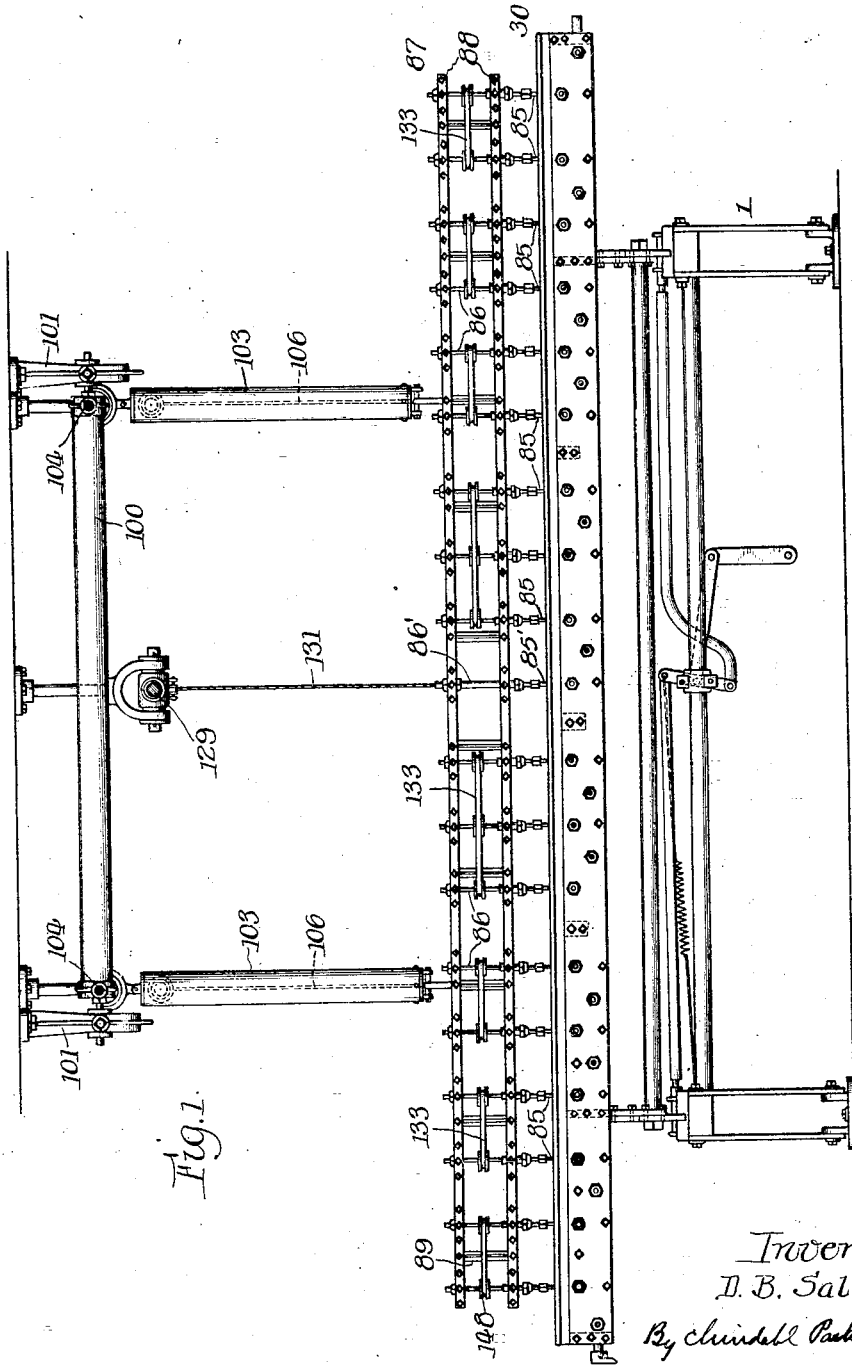

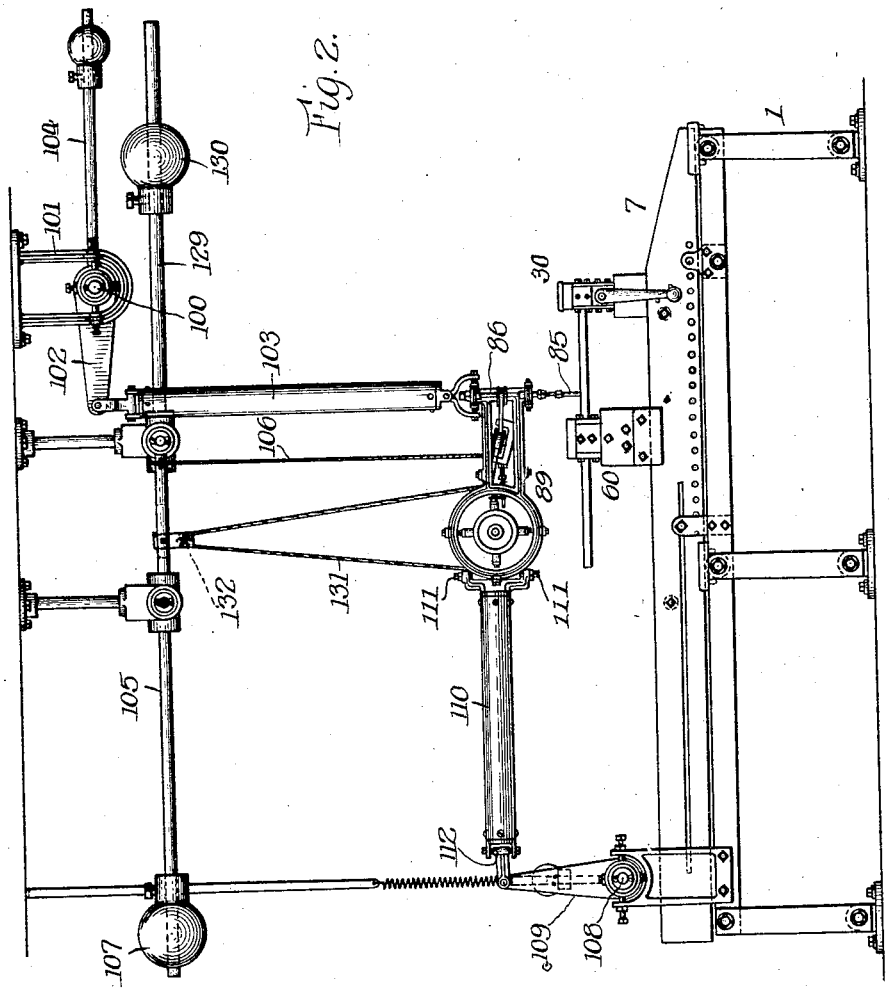

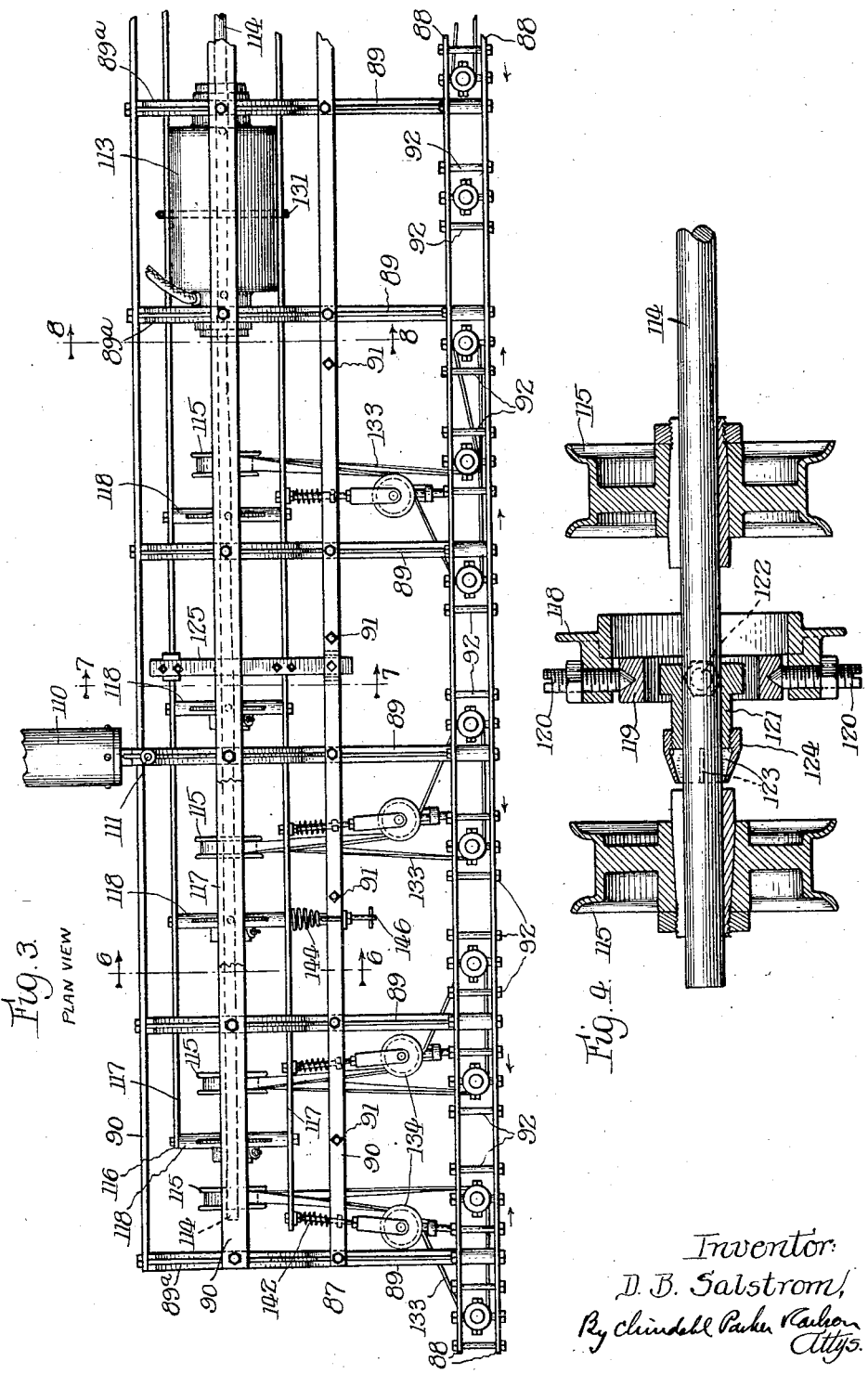

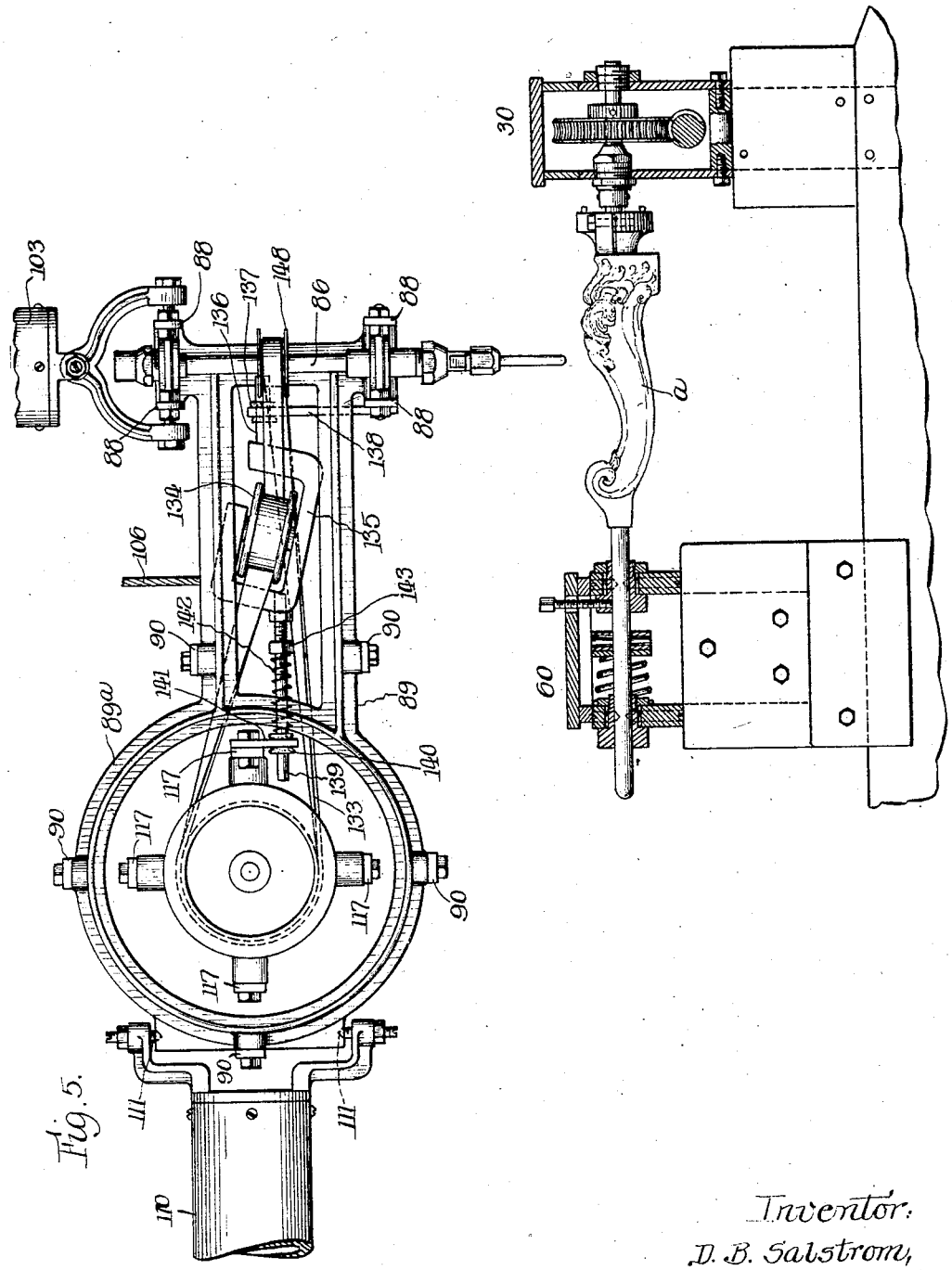

Patented Oct. 11, 1927.

1,644,952

UNITED STATES PATENT OFFICE.

DAVID B. SALSTROM, OF CHICAGO, ILLINOIS, ASSIGNOR TO SALSTROM CARVING MACHINE COMPANY, OF CHICAGO, ILLINOIS, A CORPORATION OF ILLINOIS.

WOOD-CARVING MACHINE.

Application filed July 23, 1924. Serial No. 727,603.

In the production of wood carvings by machine it is essential to attain not only a high rate of production, but at the same time to maintain a high degree of accuracy and uniformity of product and such freedom from roughness and pitting as to render hand work unnecessary in preparing the carvings for use.

In application Serial No. 715,268, filed May 23, 1924, I have disclosed a machine which is well adapted to fulfill the above-mentioned requirements. The machine shown in the present application differs from that of the earlier application principally in the construction of the cutter-supporting head and the means for driving the cutters.

In order to attain a high standard of quality of output, it is necessary to reduce vibration of the cutters to a minimum. Some of this vibration originates in the driving motor and in the belts by means of which power is transmitted from the motor to the cutter spindle. The invention herein claimed has particular reference to the provision of means whereby vibration of the cutters from such causes is reduced to a minimum.

In the accompanying drawings, Figure 1 is a front elevation of a wood-carving machine embodying the features of this invention. Fig. 2 is a left-hand end elevation of the machine. Fig. 3 is a fragmental plan view of the cutter-supporting head. Fig. 4 is a detail view of the drive shaft and drive pulleys. Fig. 5 is a fragmental left-hand end view. Figs. 6, 7 and 8 are sectional views taken in the planes indicated by dotted lines 6—6, 7—7 and 8—8, respectively, in Fig. 3. Fig. 9 is a view on line 9—9 of Fig. 7. Fig. 10 is a view on line 10—10 of Fig. 7.

The machine comprises means to support a pattern and a large number of pieces of wood to be carved into likeness to the pattern, and means for supporting the cutters, the cutter-driving means and the tracer.

The work-supporting means may be of any suitable character, that herein shown being identical with the construction fully illustrated and described in my said application Serial No. 715,268. The pattern and the work pieces are supported upon a table 7 (Fig. 2) mounted to move back and forth upon a frame or bed 1 and arranged to be locked in adjusted position by any suitable means, as, for example, that fully described in said application Serial No. 715,268. The table 7 carries a series of head stocks mounted in a head or frame 30 (Fig. 5) and a series of tail stocks supported in a frame 60. $a$ denotes a piece of work.

The cutters 85 (Figs. 1 and 2) are carried by vertical spindles 86. These spindles and their driving means are supported by a head 87 extending parallel with and above the series of head stocks and tail stocks. The head 87 consists of a rigid elongated frame comprising four longitudinal bars 88 (Fig. 5) which are rigidly secured to the forward ends of ten castings or frames 89, and five bars 90 rigidly secured to the castings 89. The two forward bars 90 are rigidly fastened together and spaced apart by members 91 (Figs. 3 and 8). The rails 88 are secured together and spaced apart by means of the tie members 92 (Fig. 3). Each of the frames 89 comprises a circular rear portion $89^a$. These circular portions and the bars 90 form a cylindrical open-work frame in which the driving motor and pulleys are located.

The spindles 86 are supported from the rails 88 by means of adjustable bearings more fully described and illustrated in my application Serial No. 715,268, filed May 23, 1924. Midway of the length of the head 87 is a dead spindle 86′ (Fig. 1) to which is secured a tracer 85′ adapted to be moved over the surface of the pattern. The latter is mounted in a headstock and a tailstock similar to those employed to support the work.

The cutter-supporting head 87 is mounted in any suitable manner for movement up and down, from side to side, and forwardly and rearwardly. The means herein shown for this purpose comprises a shaft 100 extending parallel with the head 87 and supported in hangers 101 secured to the ceiling. Fixed to said shaft are two rearwardly extending arms 102 which are connected to the head 87 by means of members 103. 104 are weighted arms extending forwardly from the shaft 100. The head 87 is further supported by means of two levers 105 (Fig. 2) the forward ends of which are connected to the head by means of cables 106 and the rear arms of which carry weights 107. The levers 105 are supported from the ceiling.

In order to maintain the cutter-carrying head 87 in parallelism with the shaft 100 I provide means including a shaft 108 (Fig. 2) supported upon the rear part of the bed of the machine parallel with the shaft 100. Extending upwardly from the shaft 108 are three arms 109, only one of which is shown in the drawings. Each of these arms is connected to the head 87 by means of a rigid radius member 110. The forward end of each radius member 110 is pivoted to the rear end of one of the frames 89 by means of pivots 111 having a vertical axis, while the rear end of each radius member 110 is connected to one of the arms 109 by means of a universal joint 112 (Fig. 2).

The machine shown in the present drawings has eighteen cutters, although it will be understood that this is not the maximum number of cutters which may be employed in a machine embodying this invention. In the machine herein illustrated the cutters are driven in groups, there being a group of three spindles at each side of the tracer and three groups of two spindles each at each side of the two three-spindle groups. All of the groups are driven by a single centrally-located electric motor the housing of which is shown at 113 in Figs 3 and 8. To each end of the armature shaft is secured a drive shaft 114 carrying flanged pulleys 115 through which power is transmitted to all the spindles. In order that the vibration of the motor and the pulleys 115 shall not be transmitted to the cutters, the motor and the shaft are supported in the manner to be now described.

A rigid frame, which may be denoted by the number 116 (Fig. 3), is formed of four longitudinal bars 117 and a plurality of spiders 118 which serve to secure the bars 117 in spaced parallel relation to form an open frame or cage to support the motor 113 and the bearings for the shaft 114. These bearings are preferably constructed as shown in Figs. 4 and 6, where it will be noted that a ring 119 is mounted on diametrically opposite cone-pointed adjusting screws 120 carried by the spider. The bearing 121 is mounted within the ring 119 upon two diametrically opposite cone-pointed adjusting screws 122 seated in the ring 119, the axis of said screws being perpendicular to and intersecting the axis of the screws 120. There is a bearing 121 in each of the spiders 118. It will be seen that notwithstanding the relatively great length of the frame or cage 116 and the bends that may exist in the bars 117, the bearings 121 may be adjusted into accurate alinement with each other.

In order to take up looseness or play in the bearings 121, each bearing is preferably constructed as shown in Fig. 4, where it will be seen that one end of each bearing is radially slotted as at 123 and is exteriorly tapered and also screw-threaded to receive a nut 124 having an internal tapered portion to coact with the tapered portion of the bearing for the purpose of compressing said bearing around the shaft.

The frame or cage 116 is located within the cylindrical frame composed of the portions 89ª and the bars 90. The frame 116 is supported to float within said cylindrical frame by means of two transverse bars 125 (Fig. 3), one at each side of the longitudinal center of the frame 116, said bars carrying stirrups 126 (Fig. 7) in which the front and rear bars 117 rest. The bars 125 rest upon anti-friction rollers 127 and 128 (Figs. 7, 9 and 10) carried by bars 90 at opposite sides of the frame 116. It will be seen that the frame 116 is movable transversely of the head 87.

The weight of the frame 116, motor 113 and shaft 114 is partially counterbalanced by means comprising a lever 129 (Figs. 1 and 2) supported from the ceiling above a point midway of the length of the machine. The forward end of the lever 129 carries a weight 130, while the rear end of the lever is connected to the parts to be supported by means of a sling or loop 131 in which the motor 113 rests. The sling 131 is suspended from a roller 132 (Fig. 2) carried by the rear end of the lever 129.

Each group of spindles is driven from one of the pulleys 115 by means of a belt 133. The belt is kept under proper tension by means including a flanged pulley 134 journaled in a bracket 135 (Fig. 5). On the front end of said bracket is a guide stud 136 which fits slidably within a bushing 137 in an opening in a bar 138 fixed to the lower rear bar 88. Preferably the bushing 137 is of leather or other vibration-absorbing material. To the rear end of the bracket 135 is secured a guide stud 139 which extends slidably through a leather bushing 140 in an opening in a bar 141 fixed to the forward bar 117. A coiled expansive spring 142 surrounds the stud 139 and is interposed between the bushing 140 and an adjusting nut 143 on the stud 139. The pressure of the spring 142 holds the pulley 134 against the belt. It will thus be seen that the springs 142 serve to tension the individual belts and compensate for variations in the lengths of the belts.

Means is provided to push the cage or frame 116 rearwardly with reference to the head 87, thus enabling the frame 116 to serve as an abutment against which the springs 142 may act in tensioning the belts. As shown in Figs. 3 and 6, a coiled expansive spring 144 is interposed between the forward bar 117 and a nut 145 on an adjusting screw 146 seated in a bar 147 attached to the forward bars 90. One such spring 144 is provided at each side of the longitudinal center of the head 87, although only one is shown in the drawings.

The belts 133 extend around flanged pulleys 148 (Fig. 5) on the cutter spindles 86. In the case of the three-spindle group, the center pulley is somewhat smaller in diameter than the others in order that the portion of the belt passing in front of the middle pulley shall not touch the portion of the belt which is running in contact with said pulley.

When a belt is to be replaced, the procedure described in my said application Serial No. 715,268 may be followed.

In operation, the workman moves the tracer over the surfaces of the pattern to cause the cutters 85 to reproduce those surfaces upon the pieces secured in the head stocks and tail stocks. Notwithstanding the length of the cutter-carrying head 87, its light weight and manner in which it is mounted enable the workman to move it back and forth, up and down and from side to side with comparative ease.

It will be noted that the driving motor 113 is supported in such a way as to prevent the transmission of injurious vibration to the cutter spindles. By reason of this construction and other features more fully described in said application Serial No. 715,268, it is possible to produce at one time a large number of copies of a given pattern, the design being so accurately reproduced and the surface being so free from pitting or roughness that little or no hand work is necessary in order to make the carvings fit for use.

Although the invention is not limited to a wood-carving machine having any particular number of cutters, the difficulties solved by the invention are greater in a machine having a large number of cutters because of the great length of the head stock, tail stock and cutter supporting heads, and the large number of rotating parts.

While I have herein shown an electric motor, and prefer such a motor because it will run with little vibration, nevertheless another type of motor may be used, if desired; and it will be understood that various other changes may be made without departing from the spirit and scope of the invention as defined by the appended claims.

I claim as my invention:

1. A wood-carving machine having, in combination, a counterbalanced elongated head supported for movement up and down, from side to side and forward and back, a series of groups of cutter spindles extending longitudinally of said head, an elongated frame supported by said head to float thereon, a single electric motor secured midway of the length of said frame, means connected to said motor and frame for counterbalancing said motor and frame, said motor having a long shaft, bearings in said frame for said shaft, pulleys on said shaft, a plurality of belts each transmitting power from one of said pulleys to one of said groups of spindles, spring means tending to move said frame with reference to said head to tension the belts, and an individual resilient belt tightener for each belt.

2. A wood-carving machine having, in combination, a counterbalanced elongated head supported for movement up and down, from side to side and forward and back, a series of groups of cutter spindles extending longitudinally of said head, an elongated frame supported by said head to float thereon, a single motor secured midway of the length of said frame, means connected to said motor and frame for counterbalancing said motor and frame, said means including a sling in which said motor is suspended, said motor having a long shaft, bearings in said frame for said shaft, pulleys on said shaft, a plurality of belts each transmitting power from one of said pulleys to one of said groups of spindles, spring means tending to move said frame with reference to said head to tension the belts, and an individual resilient belt tightener for each belt.

3. A wood-carving machine having, in combination, a counterbalanced elongated head supported for movement up and down, from side to side and forward and back, a series of groups of cutter spindles extending longitudinally of said head, an elongated frame supported by said head to float thereon, means connected to said frame for counterbalancing it, a drive shaft supported by and extending longitudinally of said frame, pulleys on said shaft, a plurality of belts each transmitting power from one of said pulleys to one of said groups of spindles, spring means tending to move said frame with reference to said head to tension the belts, and an individual resilient belt tightener for each belt.

4. A wood-carving machine having, in combination, an elongated head, a series of cutter spindles in said head, an elongated frame supported on said head for movement relative thereto, a single electric motor mounted midway of the length of said frame, said motor having a long shaft, bearings in said frame for said shaft, pulleys on said shaft, belts transmitting power from said pulleys to said spindles, means tending to move said frame with reference to said head to tension the belts, and an individual resilient belt tightener for each belt.

5. A wood-carving machine having, in combination, an elongated head, a series of cutter spindles in said head, an elongated frame supported on said head for movement relative thereto, a drive shaft extending longitudinally of and within said frame, pulleys on said shaft, belts transmitting power from said pulleys to said spindles, means tending to move said frame with reference to said head to tension the belts, and an individual resilient belt tightener for each belt.

6. A wood carving machine having, in combination, an elongated head, a series of cutter spindles in said head, an elongated frame supported by said head to float therein, a single electric motor secured midway of the length of said frame, said motor having a long shaft, bearings in said frame for said shaft, pulleys on said shaft, and belts transmitting power from said pulleys to said spindles.

7. A wood-carving machine having, in combination, an elongated head, a series of groups of cutter spindles extending longitudinally of said head, an elongated frame supported by and mounted to float in said head, a single motor secured midway of the length of said frame, said motor having a long shaft, bearings in said frame for said shaft, pulleys on said shaft, and a plurality of belts each transmitting power from one of said pulleys to one of said groups of spindles.

8. A wood-carving machine having, in combination, an elongated head, a series of cutter spindles in said head, an elongated frame extending longitudinally of and supported by said head to float therein, a shaft extending longitudinally of said frame, pulleys on said shaft, belts transmitting power from said pulleys to said spindles, and spring means bearing against said frame to tension said belts.

9. A wood-carving machine having, in combination, an elongated head, a series of cutter spindles in said head, an elongated frame extending longitudinally of and mounted to float in said head, driving means carried by said frame, and belts transmitting power from said driving means to said spindle.

10. A wood-carving machine having, in combination, an elongated head, a series of groups of cutter spindles in said head, a single electric motor supported by the head to float midway of the length of the head, said motor having a long shaft, pulleys on said shaft, and a plurality of belts each transmitting power from one of said pulleys to one of said groups of spindles.

11. A wood-carving machine having, in combination, an elongated head, a series of cutter spindles in said head, a single electric motor supported to float midway of the length of the head, said motor having a long shaft, pulleys on said shaft, and belts transmitting power from said pulleys to said spindles.

12. A wood-carving machine having, in combination, an elongated head, a series of cutter spindles extending from one end to the other of said head, a single motor supported to float midway of the length of the head, said motor having a long shaft, pulleys on said shaft, and belts transmitting power from said pulleys to said spindles.

13. A wood-carving machine having, in combination, a counterbalanced elongated rigid head supported for movement up and down, from side to side and forward and back, a series of cutter spindles extending longitudinally of said head in the forward part thereof, an elongated frame supported by said head to float within the rear portion thereof, and driving means extending from said frame to said spindles.

14. A wood-carving machine having, in combination, a counterbalanced elongated head supported for movement up and down, from side to side and forward and back, a series of groups of cutter spindles extending longitudinally of said head, a single electric motor supported by said head midway of the length of the head and floating within the head, said motor having a long shaft, pulleys on said shaft, and a plurality of belts each transmitting power from one of said pulleys to one of said groups of spindles.

15. A wood-carving machine having, in combination, an elongated head, a series of groups of cutter spindles extending longitudinally of said head, an elongated frame supported for movement relative to said head, a drive shaft supported by and extending longitudinally of said frame, pulleys on said shaft, a plurality of belts each transmitting power from one of said pulleys to one of said groups of spindles, spring means tending to move said frame with reference to said head to tension the belts, and an individual resilient belt tightener for each belt.

16. A wood-carving machine having, in combination, an elongated head, a series of cutter spindles in said head, an elongated frame supported for movement relative to the head, a drive shaft carried by said frame, pulleys on said shaft, belts transmitting power from said pulleys to said spindles, means tending to move said frame with reference to said head to tension the belts, and an individual resilient belt tightener for each belt.

17. In a carving machine, the combination of an elongated rigid head, a series of cutter spindles at the forward side of the head, a frame supported by the rear portion of the head for movement transversely of the head, and means to transmit power from said frame to said spindles.

In testimony whereof, I have hereunto affixed my signature.

DAVID B. SALSTROM.